US012734720B2

(12) United States Patent
Thalmeier

(10) Patent No.: US 12,734,720 B2
(45) Date of Patent: Sep. 15, 2026

(54) MULTI-LANE SLICING MACHINE WITH INDIVIDUALLY POSITIONABLE GRIPPERS AND CONTROL METHOD THEREFOR

(71) Applicant: MULTIVAC SEPP HAGGENMUELLER SE & CO. KG, Wolfertschwenden (DE)

(72) Inventor: Christoph Thalmeier, Stimpfach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 153 days.

(21) Appl. No.: 18/539,668

(22) Filed: Dec. 14, 2023

(65) Prior Publication Data

US 2024/0198555 A1 Jun. 20, 2024

(30) Foreign Application Priority Data

Dec. 16, 2022 (DE) ......................... 102022133591.7

(51) Int. Cl.

*B26D 7/01* (2006.01)
*B26D 1/143* (2006.01)
*B26D 7/06* (2006.01)

(52) U.S. Cl.

CPC ............... *B26D 7/01* (2013.01); *B26D 1/143* (2013.01); *B26D 7/0633* (2013.01); *B26D 2007/011* (2013.01); *B26D 2007/013* (2013.01)

(58) Field of Classification Search

CPC .............. B26D 2210/02; B26D 7/0616; B26D 7/0625; B26D 7/0633; B26D 7/0658;

(Continued)

(56) References Cited

U.S. PATENT DOCUMENTS 5,628,237 A * 5/1997 Lindee ..................... B26D 7/01 83/403.1
2007/0214969 A1 9/2007 Mueller et al.

(Continued)

FOREIGN PATENT DOCUMENTS

DE 10353114 A1 5/2005
DE 102014106353 A1 11/2015

(Continued)

OTHER PUBLICATIONS

Machine translation—Van De Meerendonk (EP 0021539).*

(Continued)

*Primary Examiner* — Boyer D Ashley
*Assistant Examiner* — Haleigh N Watson
(74) *Attorney, Agent, or Firm* — BROOKS KUSHMAN P.C.

(57) ABSTRACT

To ensure that, during slicing, a gripper can remain stationary when a log which it is holding has been completely sliced while other grippers move forward for the slicing of the other logs they are holding, a hydraulic cylinder unit is arranged between each gripper and a gripper carriage, which unit is either switched pressureless in a lane of the completely sliced log or is hydraulically connected to the other hydraulic cylinder units in order to allow the displacement of hydraulic medium from the hydraulic cylinder unit of the completely sliced log, which retracts during further slicing, into the other hydraulic cylinder units.

18 Claims, 11 Drawing Sheets

(58) Field of Classification Search

CPC ........ B26D 7/0683; B26D 7/01; B26D 7/011; B26D 7/013; B26D 7/02; B26D 7/04; B26D 1/143; B26D 5/00; B26D 5/20; B26D 5/42; B26D 2007/011; B26D 2007/013; F01D 17/26; F01L 1/465; F01L 9/16; B65G 47/917; B65G 47/74; B65G 47/88; B65G 47/8807; B65G 47/883; B65G 47/8838; B65G 47/8853; B25J 11/0045; B25J 11/0055; B25J 15/0023; B25J 15/0052; B25J 15/0616; B25J 15/0625; B25J 15/0633; B25J 15/0658; B23Q 5/00; B23Q 5/027; B23Q 5/033; B23Q 5/06; B23Q 5/22; B23Q 5/26; B23Q 5/265; B23Q 5/266; B23Q 5/268; B23Q 5/52; B23Q 7/04; B23Q 7/048; B23Q 15/00; B23Q 15/0075; B23Q 15/013; B23Q 15/22; B23Q 15/225; B23Q 15/24; B23Q 16/00; B23Q 16/001; B23Q 16/005; B23Q 16/008; B23Q 16/02; B23Q 16/021; B23Q 2705/10; B23Q 2705/12; B23Q 1/25; B23Q 1/26; B23Q 1/38; B66C 13/20; G01P 13/00

See application file for complete search history.

(56) References Cited

U.S. PATENT DOCUMENTS

| | | | | |
|---|---|---|---|---|
| 2009/0120256 | A1* | 5/2009 | Pasek | B26D 5/32<br>83/424 |
| 2013/0205960 | A1* | 8/2013 | Schmeiser | B26D 7/0608<br>83/23 |
| 2015/0321371 | A1 | 11/2015 | Mueller | |

FOREIGN PATENT DOCUMENTS

| | | | | | |
|---|---|---|---|---|---|
| DE | 102021112702 | A1 | | 11/2022 | |
| EP | 0021539 | B1 | * | 5/1983 | B23Q 7/04 |
| GB | 2386317 | | * | 9/2003 | B26D 7/04 |
| WO | 2000059689 | A1 | | 10/2000 | |
| WO | 2005037501 | A2 | | 4/2005 | |
| WO | 2005037501 | A3 | | 1/2006 | |
| WO | 2018202721 | A1 | | 11/2018 | |

OTHER PUBLICATIONS

German Search Report for DE Application No. 102022133591.7, dated Apr. 5, 2024, 12 pages (including English translation).

European Search Report for EP Application No. 23216962.3—1103, dated Jun. 10, 2024, 18 pages (including English translation).

* cited by examiner

MULTI-LANE SLICING MACHINE WITH INDIVIDUALLY POSITIONABLE GRIPPERS AND CONTROL METHOD THEREFOR

CROSS-REFERENCE TO RELATED APPLICATIONS

This application claims foreign priority benefits under 35 U.S.C. § 119(a)-(d) to German patent application number DE 102022133591.7, filed Dec. 16, 2022, which is hereby incorporated herein by reference in its entirety.

TECHNICAL FIELD

The disclosure relates to slicing machines, in particular "slicers", with which strands of an only slightly compressible product such as sausage or cheese are sliced in the food industry.

BACKGROUND

Since these strands can be produced with a cross-section that retains its shape and dimensions well over its length, i.e. substantially constant, they are called product logs.

In most cases, several product logs arranged parallel to one another are sliced simultaneously by the same blade, which moves transversely to the longitudinal direction of the product logs, cutting off one slice at a time in one pass.

The product logs are pushed forward by a feed conveyor of a feeding unit in the direction of the blade of the slicing unit, usually on an obliquely downwardly directed feed conveyor, and guided in each case through the product openings in a plate-shaped, so-called cutting frame, at the front end of which the part of the product log projecting beyond it is cut off as a slice by the blade directly in front of the slicing through-plate.

The slices usually drop onto a discharge conveyor of a discharge unit, by means of which they are transported away for further processing.

During slicing, each product log is usually held by a gripper at its rear end facing away from the slicing through-plate, which gripper is provided with corresponding gripper claws for this purpose.

The slicing machines often have a multi-lane design, which means that the feeding unit holds a plurality of adjacent product logs, each held at the rear end by a gripper, and feeds them to the cutting unit, which cuts off a slice from each of the product logs, virtually simultaneously, with a single working stroke of the single blade.

The grippers are as a rule all attached to a gripper carriage extending transversely to the feed direction, which carriage can be moved in the feed direction, which is why the grippers can essentially only be moved synchronously and can generally only be moved a very short distance relative to each other in the feed direction, in order to compensate thereby for production inaccuracies of the product log with regard to length.

However, this is not sufficient if either logs of significantly different lengths are to be sliced next to each other in the individual lanes and/or the logs are completely sliced at different times, for example because the logs are sliced with different slice thicknesses, because for this purpose the grippers have to be able to move relatively large distances relative to each other in the feed direction and the grippers have to remain stationary on the already-sliced logs while the other logs are being sliced.

At the same time, however, drive motors for the grippers on the gripper carriage should be avoided in order to keep its moving mass as low as possible.

SUMMARY

The present disclosure therefore provides a cutting machine, in particular a slicer, whose gripper unit can solve this problem, and a control method suitable for this purpose.

This is achieved by the features and embodiments described herein.

With regard to the method for controlling the product grippers attached to a gripper carriage of a multi-lane slicing machine, in which, between each product gripper and the gripper carriage, there is a hydraulic cylinder unit which is variable in length in the feed direction, in each case having a closable working chamber connection, in particular a pressure medium connection, the problem is solved as follows:

If the individual grippers are each holding one product log, i.e. in particular during normal slicing operation in which one slice is cut from each of the adjacent logs during each cutting process, the working chamber connections, in particular the pressure medium connections, will be kept closed, i.e. the hydraulic cylinder units have a fixed length, so that the logs are moved forward synchronously with the forward movement of the gripper carriage in the feed direction.

If the plurality of logs to be sliced simultaneously and held at the gripper are not all completely sliced at the same time—i.e. down to the log remnant that cannot be sliced any further—the problem arises that the gripper holding a completely sliced log must not move forward any further during the further slicing of the other logs, i.e. the further forward movement of the gripper carriage, as it would otherwise be damaged, for example by the blade.

To prevent this, a connection of the working chamber of the hydraulic cylinder unit holding this log via the gripper is opened after a log has been completely sliced, in particular immediately after it has been completely sliced. As a result, when the gripper carriage is moved further forward for the purpose of slicing the remaining logs, this hydraulic cylinder unit can become shorter by retraction of the piston into the cylinder, so that the gripper fastened thereto remains stationary, while the grippers of the logs not yet completely sliced move further forward, this being effected by the gripper carriage.

As soon as the next log is completely sliced, the working chamber of its associated working cylinder unit is also opened.

As a result, when the gripper carriage is advanced further, the grippers of the unsliced logs are moved further forward, but the grippers of the two logs already sliced remain stationary, with the lengths of their hydraulic cylinder units reduced.

For this purpose, it must first be detected whether a log has been completely sliced, which is usually done by an end-position sensor relating to the corresponding gripper, which signals when the gripper has reached its maximum permissible position—the foremost position in the feed direction—which can be achieved very easily by a simple mechanical stop against which the gripper, in particular its gripper base body, runs.

A first possibility for ensuring that the grippers of the completely cut logs remain stationary, in particular at the end position stop, is to connect the pressure medium connections of the hydraulic cylinder units to each other hydraulically.

The pressure medium connections of all the hydraulic cylinder units are then opened as soon as the first log has been completely sliced. As a result, the gripper, which in particular rests against the end position stop and is for example attached to the piston rod of the corresponding hydraulic cylinder unit, can move the piston into the cylinder when the gripper carriage moves forward and thus maintain its position unchanged.

As a result, the piston presses pressure medium out of its working chamber and displaces it into the working chambers of the other working chambers of the other hydraulic cylinder units, which chambers are connected hydraulically, for example via a connecting line, as a result of which their piston rods are additionally extended out of their cylinders by a corresponding fraction of the travel path of the piston of the completely sliced first log.

To compensate for this, starting from the time of the opening of all the pressure medium connections the gripper carriage is moved forward with a shorter travel distance between the individual slicing processes in order to continue to maintain a uniform slice thickness.

Identical working cylinder units are usually used for all the grippers, so that given n hydraulic cylinder units and only one gripper in contact with the stop, the travel distance, which usually corresponds to the slice thickness, must be reduced by the (n−1)th part for the further slicing.

If two grippers are already resting against their end stop and are no longer to be moved further or cannot move further, this travel distance of the gripper carriage is reduced by the (n−2)th part of the normal travel path, i.e. if no log has yet been completely sliced and no gripper is yet resting against its stop, etc.

As a rule, the hydraulic cylinder units will be hydraulic cylinders that can only be acted upon at one end, in each of which there is only one working chamber that can be acted on by pressure medium, which chamber is located at the end of the piston in the cylinder facing away from the piston rod or, in the case of a plunger solution, is the space between the plunger and cylinder.

In this way, without complex controlling and separate drives, in particular electric motors on the individual grippers, a work order can be handled in which the individual logs to be sliced simultaneously are completely sliced at different times.

In a second possibility, it is possible to prevent the grippers, which no longer move with the gripper carriage and in particular are resting against the end stop, from influencing the length of the remaining working cylinder units during further slicing, by providing the working chambers of the hydraulic cylinder units with, in addition to the pressure medium connection, a further pressureless connection that can be closed or opened in a controlled manner.

A pressureless connection is generally understood to be a connection that can be open to the environment and thus to ambient pressure, or also to a pressure chamber with a pressure lower than the ambient pressure $p\mathbf{0}$, for example down to a vacuum, i.e. p=zero.

As a rule, however, the pressureless connection will be an open outlet that is under ambient pressure $p\mathbf{0}$, and which leads for example to a tank for the pressure medium, which tank is also under ambient pressure, i.e. $p\mathbf{0}$.

In such a configuration, immediately after the complete slicing of the first log, i.e. when the end position sensor, in particular the end position stop, has detected the end position of the corresponding gripper, the additional connection, in particular a pressureless connection, is opened only in this hydraulic cylinder.

'Immediately after' means that this takes place even before the first separation process after the complete slicing of the first log, i.e. when the first gripper has reached its end position.

Since the pressure medium does not flow into the other hydraulic cylinders from this hydraulic cylinder and does not influence their piston position, from this time on the gripper carriage can be moved further forward with unchanged travel distance between the separating processes, i.e. generally corresponding to the desired slice thickness.

Whether the pressure medium connections on the individual hydraulic cylinder units are hydraulically coupled and are pressurized by a common hydraulic pump or are not connected and are pressurized via individual hydraulic pumps is irrelevant for this purpose.

However, the additional connections each require their own controllable shut-off valve.

Since the logs to be sliced in parallel can also have a different initial length, i.e. before the start of slicing, the procedure for gripping is such that the hydraulic units are first brought into an initial position in which the piston rods are preferably all extended to the same length, but the pistons are neither in the front nor the rear end position, i.e. at the respective stop, but are in particular in the middle 50% of the length of the cylinder.

For this purpose, a compression spring can preferably be arranged between the piston and the end of the cylinder at the end of the piston facing away from the working chamber, or the cylinder can be a double-actuatable hydraulic cylinder, in which a working chamber is formed at each end of the piston, both of which can be pressurized with the same working pressure in order to assume the initial position.

The gripper carriage is then moved forward, so that the grippers each successively contact and grip the log in their lane, starting with the longest log and ending with the shortest log.

Two possible variants of this procedure are described in more detail with reference to the figures, depending in particular on the design of the slicing machine.

When all logs are gripped, all working chamber connections, in particular the pressure medium connections, of the individual cylinders are closed. This creates a connection having constant length between the grippers and the gripper carriage, so that all logs gripped by the grippers are pushed forward synchronously with the gripper carriage for the slicing process.

Preferably, the pressure prevailing in the working chamber of the hydraulic cylinder can be used to activate the gripper, i.e. to move the gripper prongs forward into the log relative to the gripper base body, in particular before the pressure medium connections are blocked and after the respective log has been contacted by the gripper.

A multi-lane slicing machine for slicing product logs into slices is known to comprise

- a base frame,
- a slicing unit having a blade,
- a feeding unit with a feed conveyor for feeding the log to the slicing unit,
- a controller for controlling the moving parts of the slicing machine.

One slice can in each case be separated from the logs quasi-simultaneously in each separating process using only one, usually rotating, blade that extends across all lanes in the transverse direction.

Here, the feeding unit comprises one gripper per lane for gripping and holding in each case one log, a gripper carriage to which all grippers are attached, a carriage guide along which the gripper carriage can be moved in a controlled manner in the feed direction.

A slicing machine according to the disclosure which is suitable in particular for carrying out the method described above further comprises a hydraulic cylinder unit between each gripper and the gripper carriage, which unit is effective in the feed direction, i.e. can change its length in the feed direction by retracting or extending the piston into or out of the cylinder. This unit is mechanically operatively connected to the respective gripper on the one hand and to the gripper carriage on the other.

Each hydraulic cylinder unit, i.e. its working chamber between the piston and cylinder, has a pressure medium connection that can be opened or closed by means of a controllable shut-off valve.

Furthermore, in the movement path of the gripper or of the part of the hydraulic cylinder unit connected to the gripper there is a stationary end-position sensor which indicates when the gripper, in particular its base body, has reached its forwardmost permissible position, the front end position, in the feed direction.

Preferably, the end-position sensor is a mechanical end-position stop for the gripper base body, but it could also be a contactless sensor which is then at least in signal communication with the controller.

It is thereby possible, when the end position of a gripper is reached, to automatically open the corresponding shut-off valve in the pressure medium connection of this hydraulic cylinder, or also all the shut-off valves, by means of the controller. In the case of the mechanical end-position stop, this is possible by a mechanical operative connection between the stops of the gripper base bodies and the corresponding valve(s); in the case of a clueless end-position sensor at least one valve drive is required, which can be controlled by the controller.

As a result, the slicing machine can also handle work orders in which the logs sliced in parallel are sliced at different times.

Preferably, the pressure medium connections of the, in particular of all hydraulic cylinder units are hydraulically connected to each other via a connecting line so that the same pressure prevails in all working chambers of the various hydraulic cylinders when the shut-off valves on the individual pressure medium connections are open.

This applies in each case to the corresponding working chambers of the hydraulic cylinder units if the working cylinder units have a plurality of, for example two, working chambers, i.e. the working cylinders are ones that can be acted upon in both operating directions.

Preferably, however, the hydraulic cylinders are ones that can be acted on only in one direction, i.e. at one end, and in particular are identical hydraulic cylinders, so that their respective single working chambers are connected to each other via the connecting line. This working chamber is preferably located at the end of the piston facing away from the gripper.

In particular, it is immaterial whether the gripper is operatively connected to the piston rod and the piston or to the cylinder.

Preferably, each working cylinder unit has a spring whose spring force is opposite to the direction of movement of the piston when pressure is applied to the working chamber. As a result, for the assuming of the initial position before the gripping of logs, the piston can be set to an initial position in the middle region and not in one of the end positions of the cylinder.

This is because when the gripper is connected to the respective piston rod and in the initial position and likewise in the case of gripped logs all pistons are in the foremost, maximally extended position, i.e. in particular in contact with the end face of the cylinder, these pistons cannot extend any further, which however is necessary when there is complete slicing of the first log, this being due to the pressure medium displaced from this cylinder into the other hydraulic cylinder units.

In contrast, it is irrelevant for the implementation of the disclosure whether the individual hydraulic cylinder units can be pressurized by a common hydraulic pump via a common connecting line, or whether each unit has its own hydraulic pump that accomplishes this.

In a second design of the disclosure, each hydraulic cylinder unit additionally has a drain line containing a drain valve, via which the working chamber can be connected to a low-pressure chamber, in particular a tank for the pressure medium or to an open outflow.

In addition, there is of course also a pressure medium connection for pressurizing the at least one working chamber.

However, the drain line enables the drain valve in its drain line to be opened after a log has been completely sliced, i.e. the working chamber is switched pressureless, and in this way the gripper can remain stationary at this log remnant, i.e. the completely sliced log, despite the gripper carriage continuing to move forward in the feed direction.

Both the drain valve and the shut-off valve of the pressure medium connection can thus be closed for normal slicing operation—if no log has yet been completely sliced.

In both designs, the gripper can have gripper prongs that can be extended from the gripper base body, as well as a prong drive for such a movement of the gripper prongs.

Preferably, the corresponding hydraulic cylinder unit can then be used as a prong drive, for example in that the corresponding piston rod is operatively connected to the gripper prongs such that a forward movement of the piston rod relative to the gripper base body, for example after contacting of the log by the gripper base body, causes the piston rod to bring about an increasing extension of the gripper prongs.

BRIEF DESCRIPTION OF THE DRAWINGS

Embodiments in accordance with the disclosure are described in more detail below by way of example. In the figures.

DETAILED DESCRIPTION

Figure 1A:
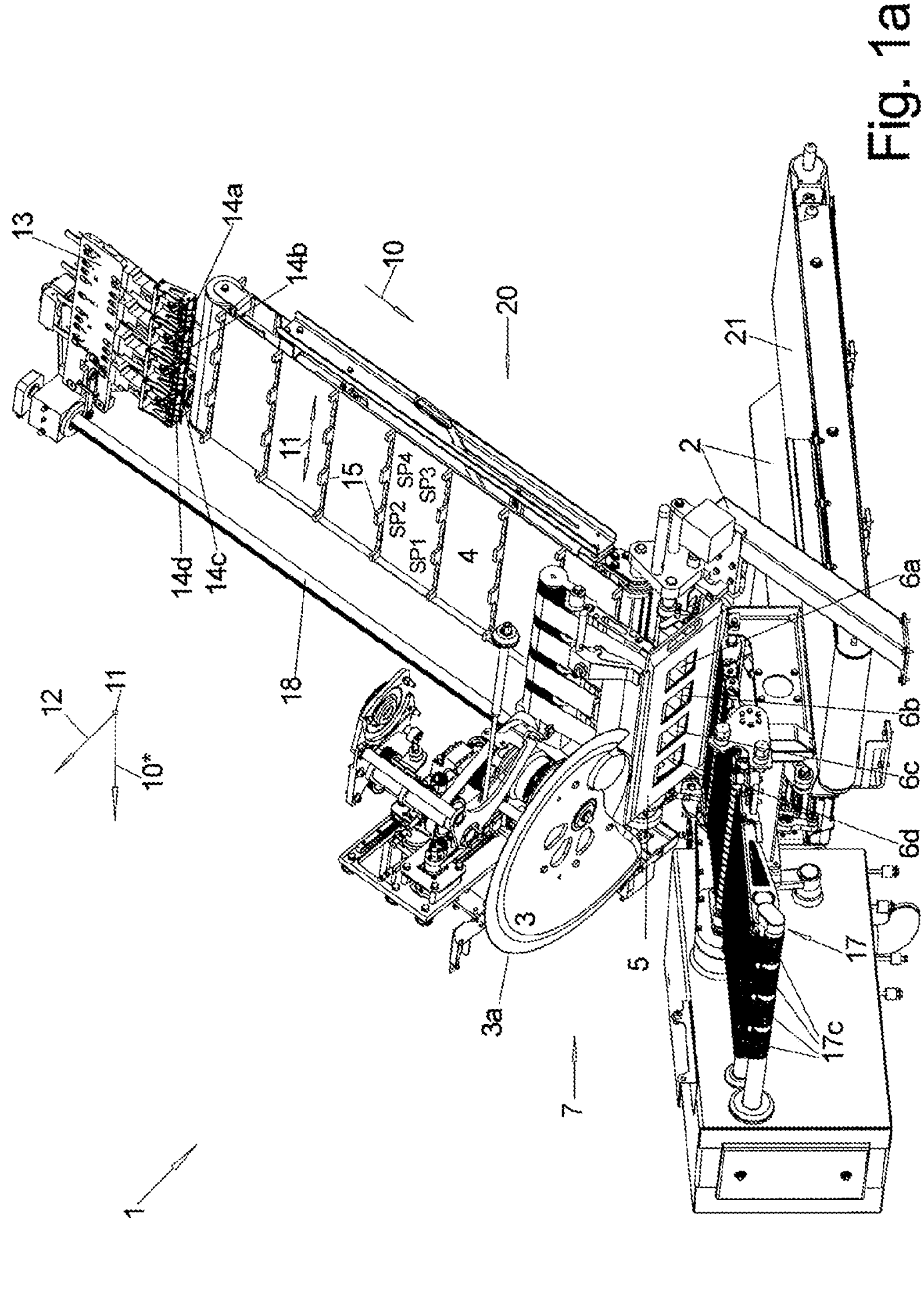
FIGS. 1$a$ and 1$b$: show a slicing machine in the form of a slicer in accordance with the prior art in different perspective views, with feed belt swung up into the slicing position, FIG. 2$a$: shows a simplified side view, as compared to FIG. 1$c$, of the slicing machine, loaded with a product log, FIG. 2$b$: shows a side view in accordance with FIG. 2$a$, but with the feed belt swung down into the loading position and the product log sliced except for a log remnant.
Figure 1B:
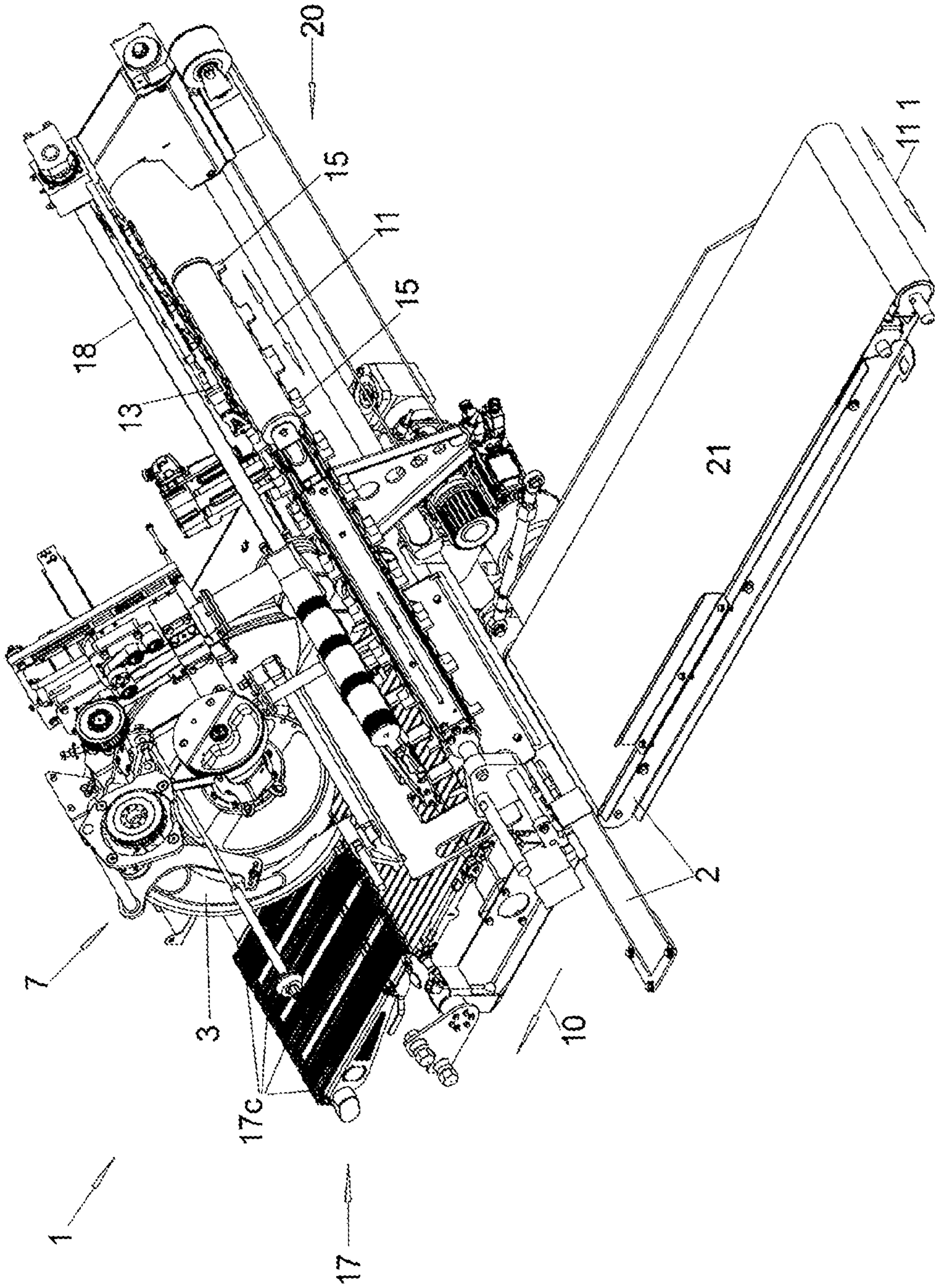

FIGS. 1*a*, 1*b* show different perspective views of a multi-lane slicer 1 for simultaneously slicing a plurality of product logs K in a respective lanes SP1 to SP4 next to each other and depositing them in shingled portions P each consisting of several slices S with a general direction of travel 10* through the slicer 1 from right to left.

Figure 2A:
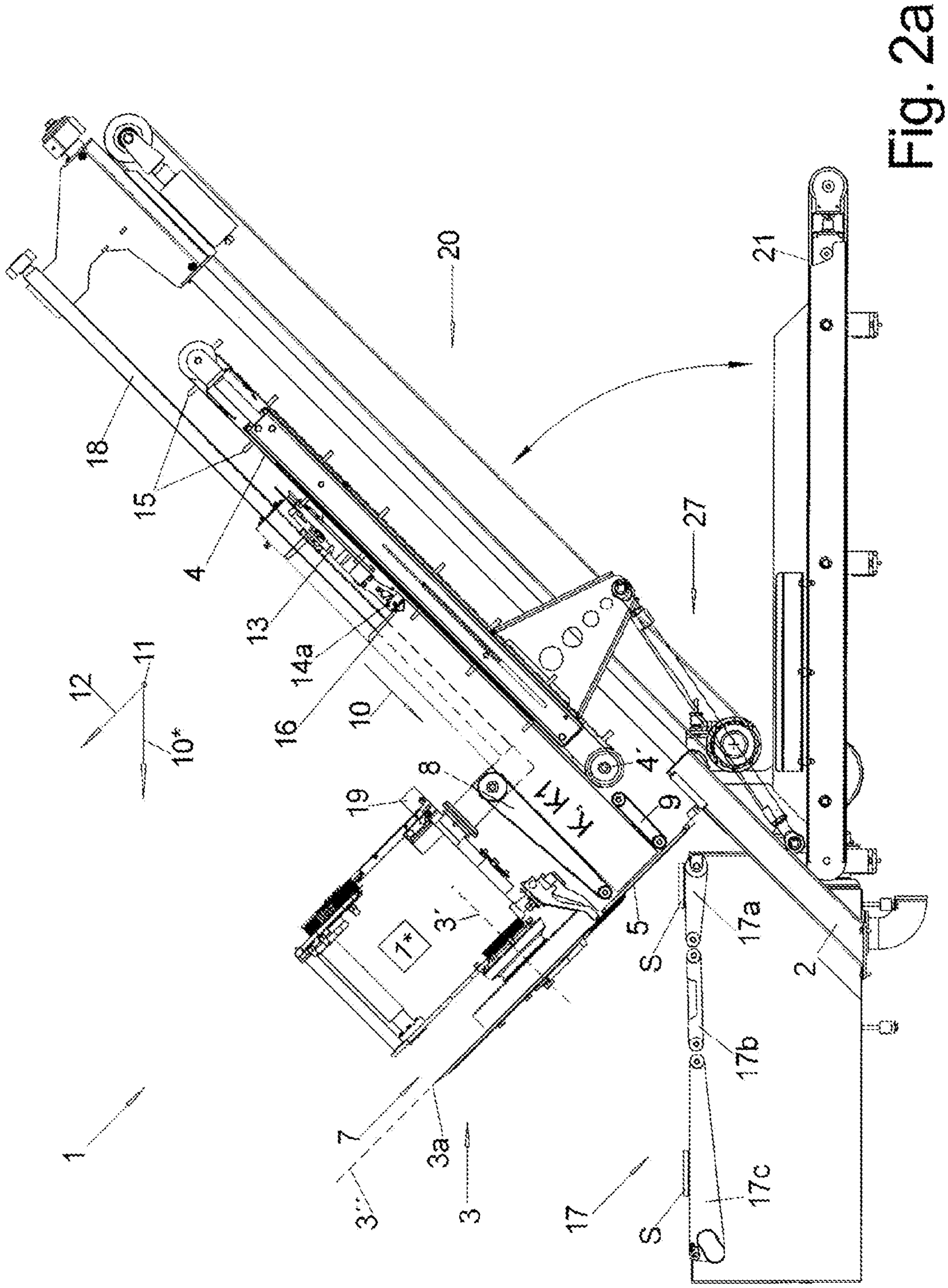

FIG. 2*a* shows—without and with the log K inserted—a side view of this slicer 1, omitting covers and other parts not relevant to the disclosure, which are attached to the base frame 2 in the same manner as all other units, so that the functional parts, particularly the conveyor belts, can be seen more clearly. The longitudinal direction 10 is the feed direction of the logs K to the slicing unit 7 and thus also the longitudinal direction of the logs K lying in the slicer 1.

It can be seen that the basic structure of a slicer 1 according to the prior art is that a slicing unit 7 with a blade 3 rotating about a blade axis 3", in this case a sickle blade 3, is fed with a plurality of, in this case four, product logs K lying transversely to the feed direction 10 next to one another on a feed conveyor 4 with spacers 15 of the feed conveyor 4 between them are fed by this feeding unit 20, from the front ends of said logs the rotating blade 3 cuts off a slice S with its cutting edge 3*a* in each case in one operation, that is to say almost simultaneously.

Figure 2B:
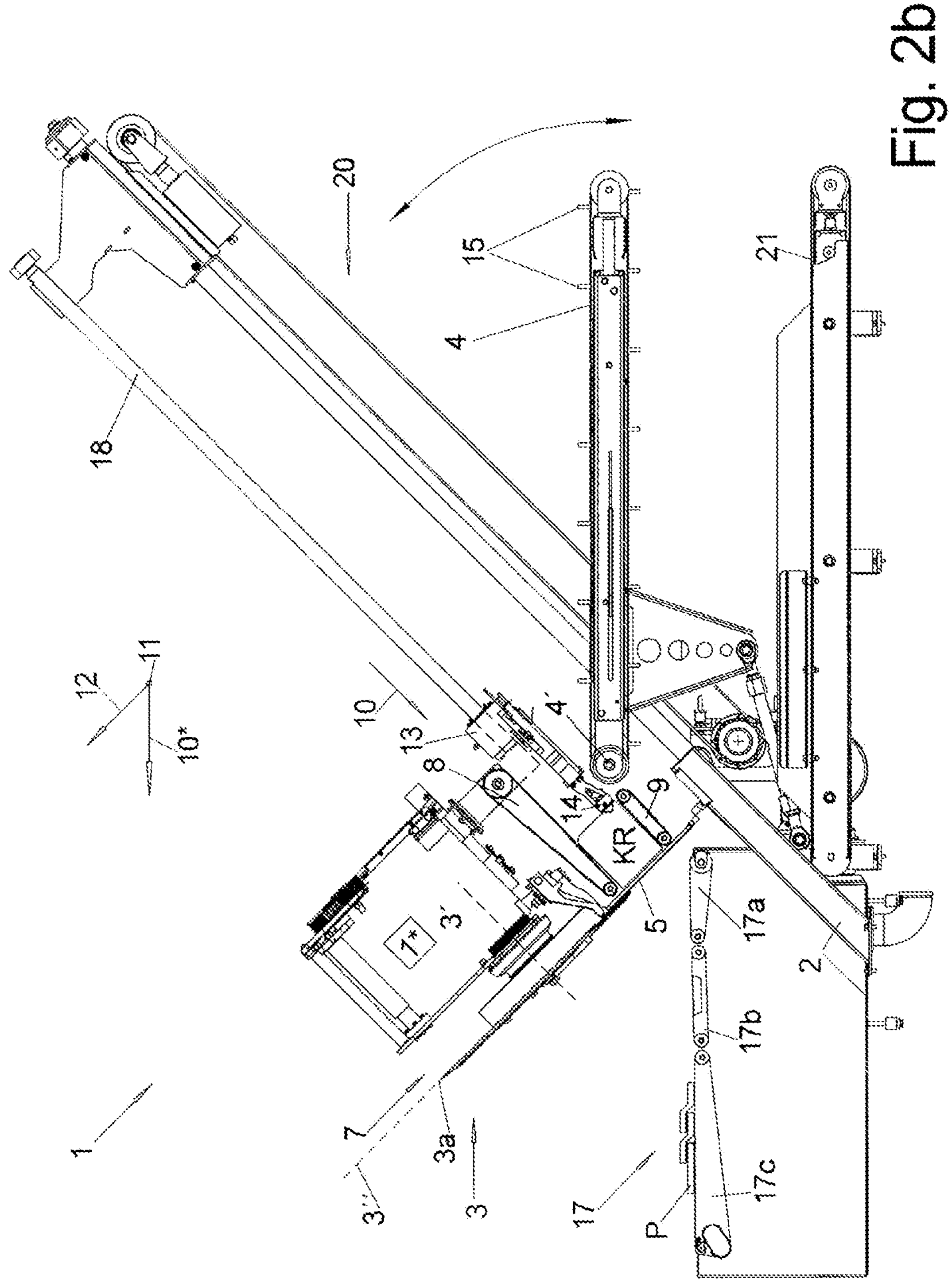

For slicing the product logs K, the feed conveyor 4 is in the slicing position shown in FIGS. 1*a*-2*a* and is oblique in side view, with a low-lying front end on the slicing side and a high-lying rear end, from which it can be folded down about a pivot axis 20' extending in its width direction, the first transverse direction 11, which is located in the vicinity of the slicing unit 7, into an approximately horizontal loading position as represented in FIG. 2*b*.

The rear end of each log K lying in the feeding unit 20 is held in accordance with FIG. 2*a* in each case by a gripper 14*a*-*d* by positive locking with the aid of gripper claws 16. These grippers 14*a*-14*d*, which can be activated and deactivated with regard to the position of the gripper claws 16, are fastened to a common gripper carriage 13, which can be moved along a gripper guide 18 in the feed direction 10.

In this case, both the feed of the gripper carriage 13 and of the feed conveyor 4 can be driven in a controlled manner, wherein, however, the actual feed speed of the logs K is effected by a so-called upper and lower product guide 8, 9 which is also driven in a controlled manner and which engages the upper side and lower side of the logs K to be sliced in their front end areas near the cutting unit 7.

The front ends of the logs K are in each case guided through a product opening 6*a*-*d* of a plate-shaped slicing frame 5, wherein the slicing plane 3" extends directly in front of the front, obliquely downward pointing end face of the slicing frame 5, in which the blade 3 rotates with its slicing edge 3*a* and thus cuts off the protrusion of the logs K from the slicing frame 5 as a slice S. The slicing plane 3" extends perpendicular to the upper run of the feed conveyor 4 and/or is spanned by the two transverse directions 11, 12 to the feed direction 10.

In this case, the inner circumference of the product openings 6*a*-*d* of the cutting edge 3*a* of the blade 3 serves as a counter-cutting edge.

Since both product guides 8, 9 can be driven in a controlled manner, particularly independently of one another and/or possibly separately for each lane SP1 to SP4, these determine the—continuous or clocked—feed speed of the logs K through the slicing frame 5.

The upper product guide 8 is displaceable in the second transverse direction 12—which extends perpendicular to the surface of the upper run of the feed conveyor 4—to adapt to the height H of the log K in this direction. In addition, at least one of the product guides 8, 9 can be designed to pivot about one of its deflection rollers in order to be able to change to a limited extent the direction of the run of its guide belt resting against the log K.

The slices S, which are at an angle in space when they are being separated, drop onto a discharge unit 17 which starts below the cutting frame 5 and extends in the direction of travel 10*, which in this case consists of a plurality of discharge units 17*a, b, c* arranged one after the other with their upper runs approximately aligned in the direction of travel 10*, of which the first discharge unit 17*a* in the direction of travel 10 can be designed as a portioning belt 17*a* and/or one can also be designed as a weighing unit.

The slices S can hit the discharge unit 17 individually and be spaced apart from one another in the direction of travel 10* or, by appropriate control of the portioning belt 17*a* of the discharge unit 17—whose movement, like those of all moving parts described herein, may be controlled by the controller 1*—form shingled or stacked portions P by mostly stepwise forward movement of the portioning belt 17*a*. In that regard, as one skilled in the art would understand, the controller 1*, as well an any other unit, machine, apparatus, element, sensor, device, component, system, subsystem, arrangement, or the like described herein may individually, collectively, or in any combination comprise appropriate circuitry, such as one or more appropriately programmed processors (e.g. one or more microprocessors including central processing units (CPU)) and associated memory, which may include stored operating system software and/or application software executable by the processor(s) for controlling operation thereof and/or for performing the particular algorithms represented by the various functions and/or operations described herein, including interaction and/or cooperation between any such controller, unit, machine, apparatus, element, sensor, device, component, system, subsystem, arrangement, or the like. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Below the feed conveyor unit 20 there is usually an approximately horizontally extending residue conveyor 21, which starts with its front end below the cutting frames 5 and directly below or behind the discharge unit 17 and with its upper run thereon transports away dropping residues to the rear—by means of the drive of one of the discharge conveyors 17 counter to the direction of travel 10.

Figure 3:
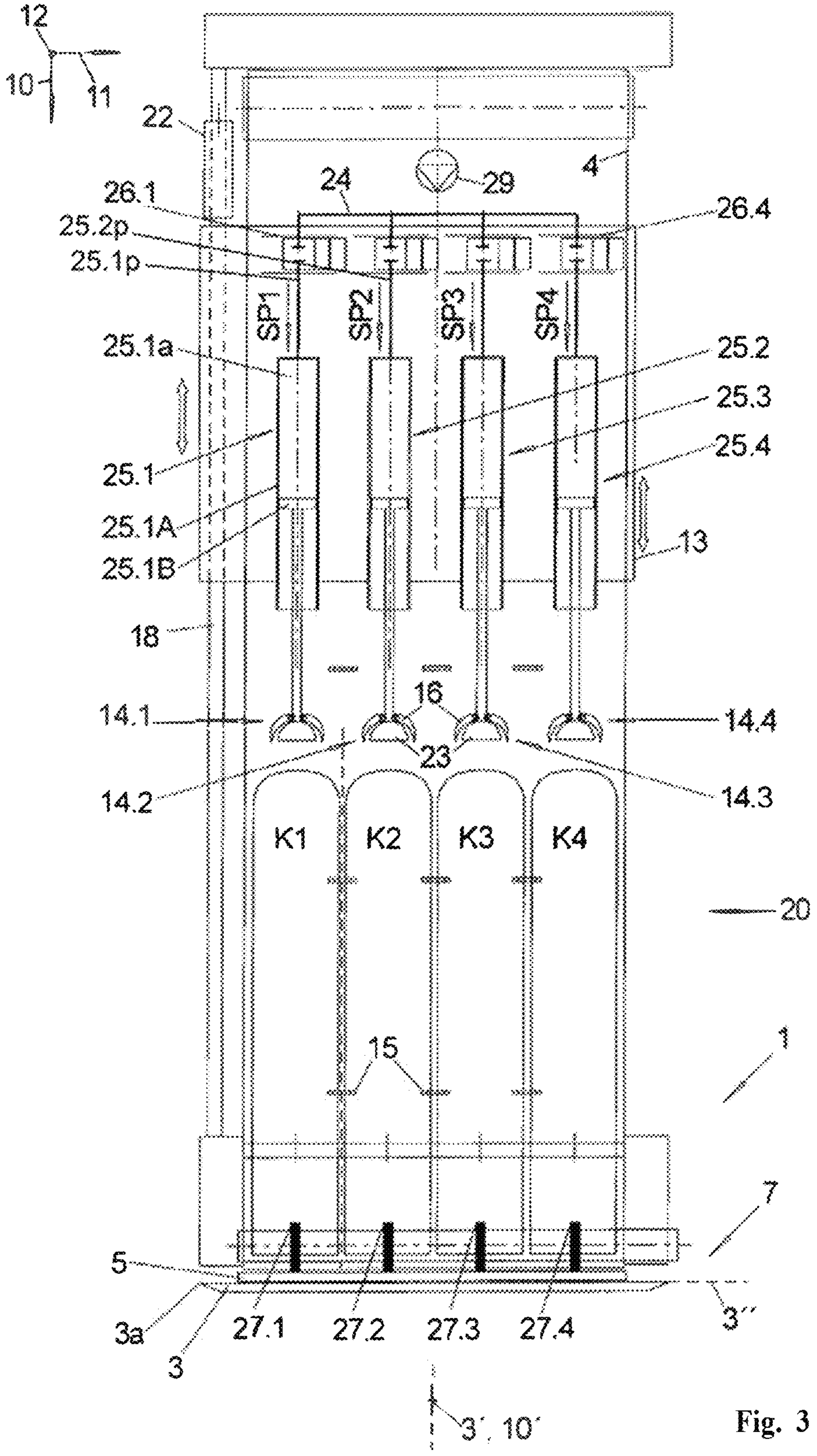
FIG. 3: shows a first embodiment of the disclosure in a plan view of the slicing machine in FIGS. 1$a$, $b$, viewed perpendicular to the feed belt swung up into the slicing position, FIGS. 4$a$-$f$: show different movement states during the gripping of newly inserted logs of different lengths with this first embodiment.

FIG. 3 shows a plan view of the feed unit 20 and the cutting unit 7, as in a four-lane slicing machine four new logs K1 to K4, ideally of equal length, lie next to each other on the individual lanes SP1 to SP4—separated by the spacers 15—on the upper run of the feed belt 4 and rest with their front end in the feed direction 10 against a stop not shown, for example the blade 3.

The gripper carriage 13, on which a gripper 14.1-14.4 is fastened above each lane SP1 to SP4, is guided on one side of the feed belt 4 along a gripper guide 18 in the feed direction 10—the longitudinal direction 10—and can be driven in the feed direction 10 in a controlled manner by means of a carriage drive 22 (shown symbolically).

Each gripper, e.g. 14.1, is attached to the piston rod of an associated hydraulic cylinder unit 25.1, the piston rod and the piston 25.1B being movable in the feed direction 10 relative to the cylinder 25.1A therein.

The pistons are shown in the same longitudinal position within the cylinders as the initial position, and therefore the grippers 14.1-14.4 are also in the same longitudinal position, as the piston rods should be the same length.

These are hydraulic cylinders 25.1-25.4 that can have pressure applied to them only at one end, each with only one working chamber, e.g. 25.1*a*, between the piston and cylinder on the side of the piston 25.1 B facing away from the gripper 14.1.

The individual working chambers 25.1*a*-25.4*a* each have a pressure medium connection which are connected to one another outside the cylinders via a connecting line 24, so that the working chambers 25.1*a*-25.4*a* can be pressurized jointly by a hydraulic pump 29 connected thereto.

Each of the pressure medium connections 25.1*p*-25.4*p* can be closed by means of a shut-off valve 26.1-26.4 which is located between the pressure medium connection and the connecting line 24.

FIG. 3 thus shows the initial position before the gripping of the individual logs K1 to K4 by the grippers 14.1-14.4, which are not yet in contact with them.

Figures 4A, 4B, 4C:
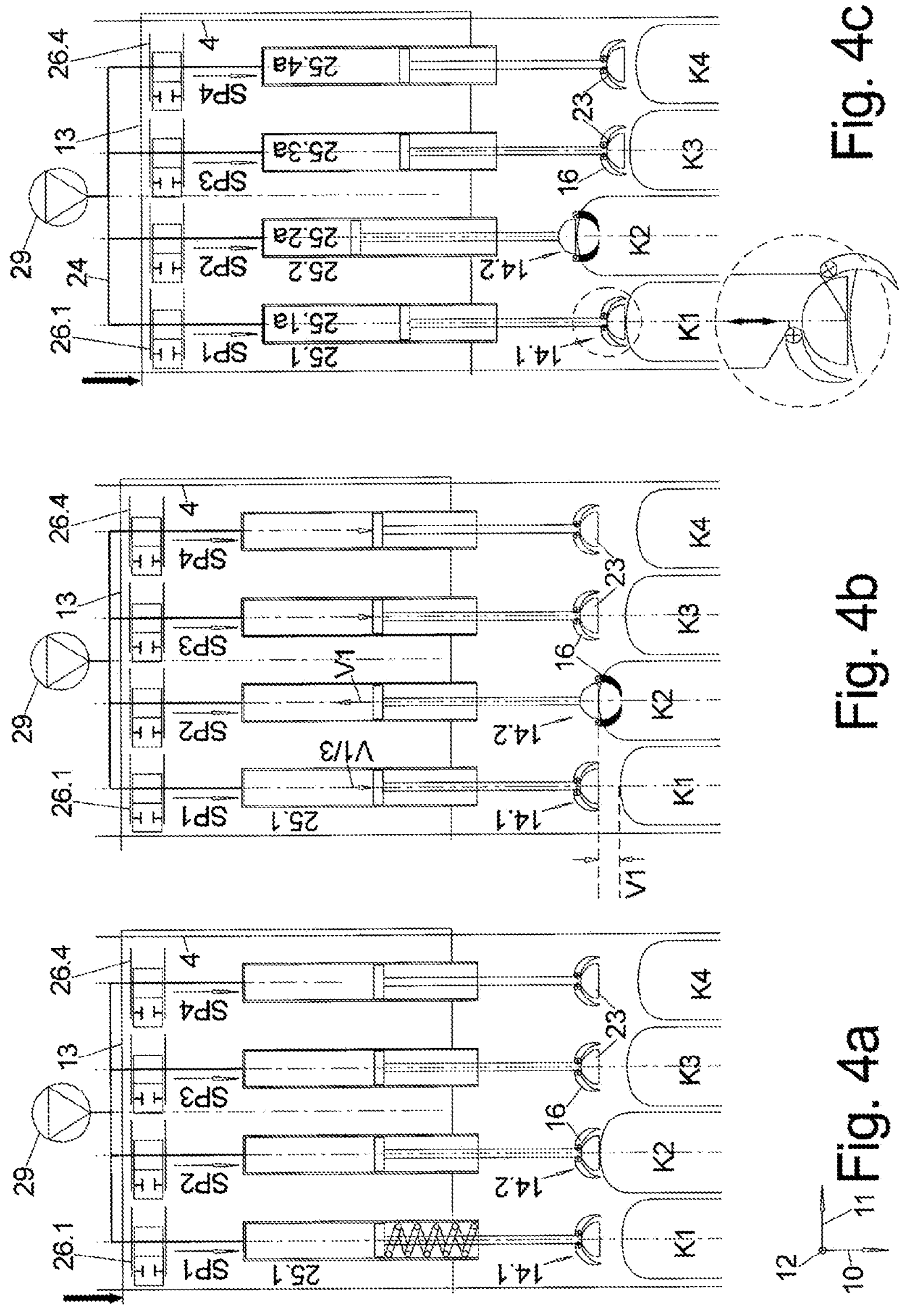

FIGS. 4*a*-*f* show, starting from this starting position, in different functional positions, the gripping of the logs K1-K4, here realistically shown as having not exactly the same length:

According to FIG. 4*a*, from the starting position shown in FIG. 3 the carriage 13, with the hydraulic cylinders 25.1-25.4 attached to it, is moved forward in the longitudinal direction 10 until one of the grippers which are in the same longitudinal position reaches the longest log and makes contact. This is the case here in lane SP2.

Then, as shown in FIG. 4*b*, this first contacting gripper 14.2 is activated, i.e. its gripper claws 16 are extended into the log K2, gripping it.

Depending on the design of the claw drive, this may require a slight further extension of the piston rod of the corresponding hydraulic cylinder unit—as shown in an enlargement in FIG. 4*c* for reasons of space:

When the base body 23 of the corresponding gripper is stationary, for example resting against the log, the piston rod, which has inclined surfaces on its front end that are at an angle to the direction of extension, can retract into the base body 23 or move along it and in doing so move, with its inclined surfaces, the claws 16 of this gripper along a guide, in particular a slide guide, into the extended position engaging in the log.

At the latest before the carriage 13 continues to move forward as shown in FIG. 4*c*, the shut-off valves 26.1-26.4 are all opened so that the gripper 14.2, which is already in contact with the log K2, together with the piston rod to which it is attached, remains stationary despite the carriage 13 continuing to move forward, and the corresponding cylinder 25.2A relative to the piston rod 25.2B, and pressure medium is thereby displaced from its working chamber 25.2*a* via the connecting line 24 into the other working chambers 25.1*a*, 25.3*a*, 25.4*a*.

For working chambers each having the same cross-section, this means—as shown in FIG. 4*b*—that when the piston rod of the working cylinder unit 25.2 is retracted by the offset distance V1, the other, in this case three, piston rods are each extended from their cylinders by ⅓ of V1.

This takes place during the forward movement of the carriage 13, which continues until the second-longest log is contacted by the gripper there, in this case the log K1 in the lane SP1 by the gripper 14.1, as shown in FIG. 4*c*.

Figure 4F:
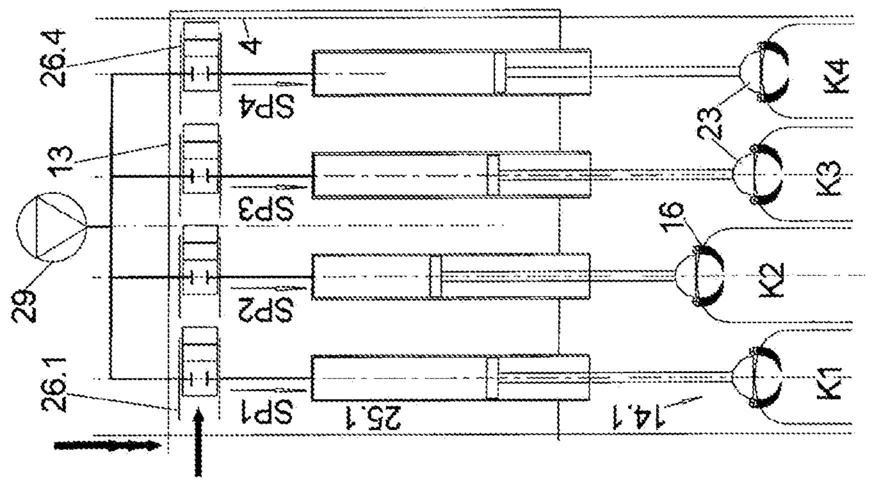
Figure 4E:
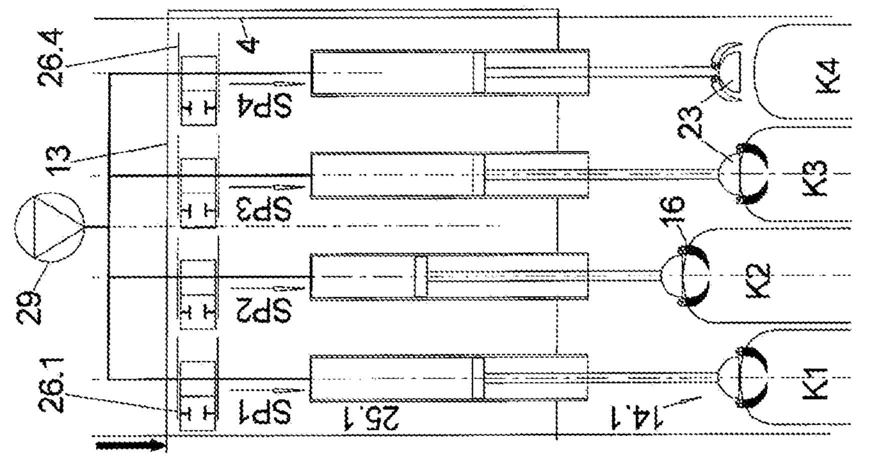
Figure 4D:
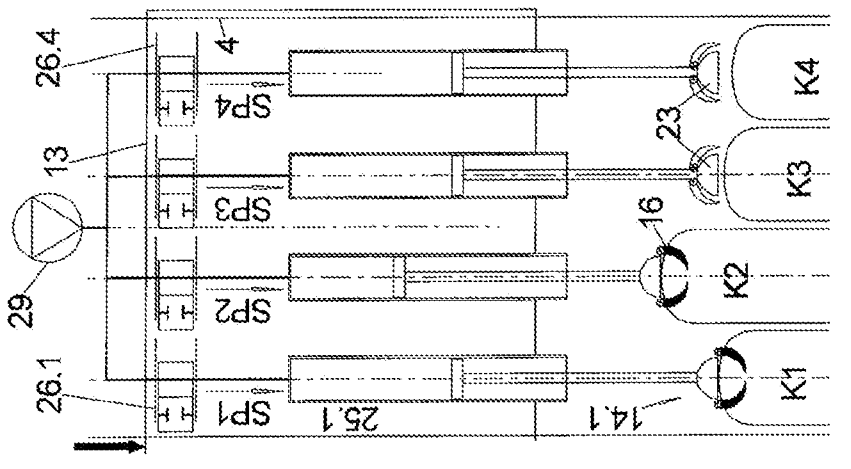

The gripper claws 16 of this gripper 14.1 are then extended and the log K1 is gripped as shown in FIG. 4*d*.

The third-longest log K3 as shown in FIG. 4*e* and the last, shortest log K4 as shown in FIG. 4*f* are also gripped in the same sequence after the further forward movement of the carriage 13.

After this, the shut-off valves 26.1-26.4 are all closed before the simultaneous slicing of the logs K1-K4 begins with further forward travel, step-by-step or continuous, of the carriage 13, as shown in FIG. 4*f* with the solid arrows.

Figure 5C:
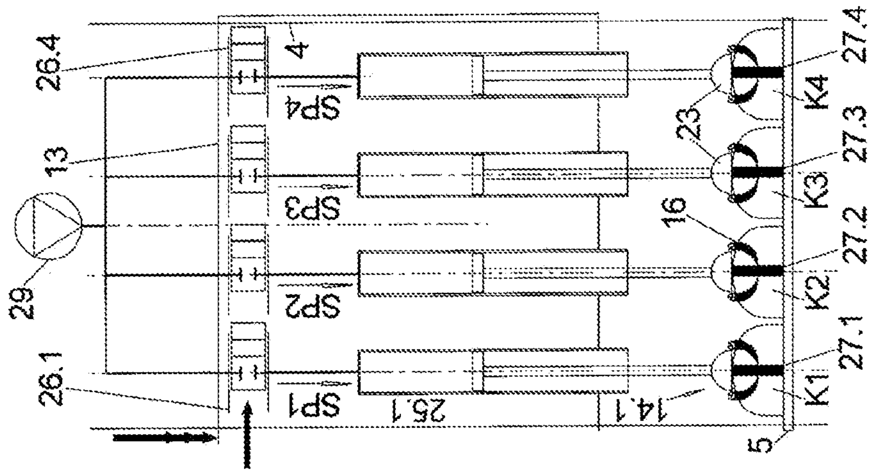
FIGS. 5*a*-*c*: show different movement states when the logs have been completely sliced, which occurs at different times, with this first embodiment.
Figure 5B:
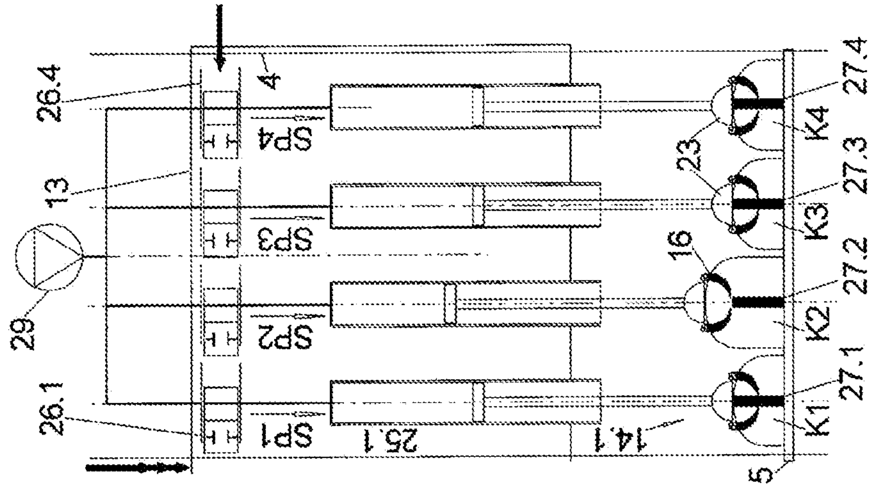
Figure 5A:
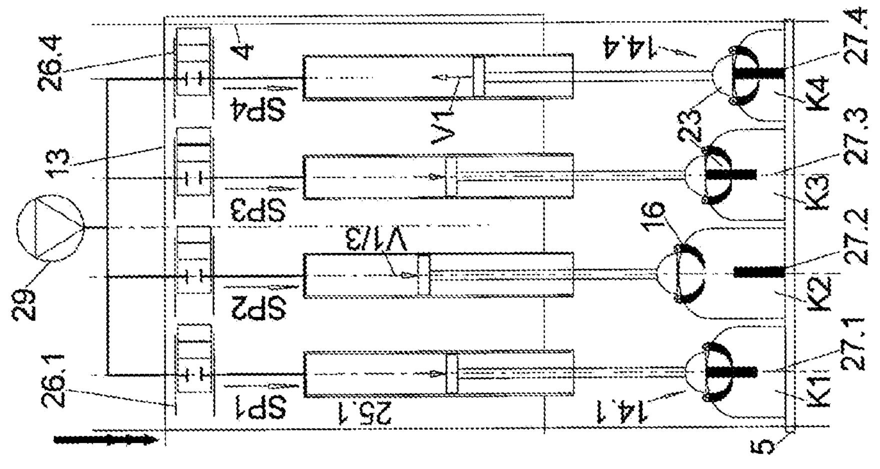

FIGS. 5*a* to 5*c* show the end of the slicing operation, the logs K1-K4 being completely sliced at different times.

According to FIG. 5*a*, the log K4 is the first to be completely sliced, so that the gripper 14.4 holding it rests with its base body 23 against the end position stop 27.4, which is present in all lanes, and cannot be moved forward any further.

Then, triggered by this, all shut-off valves 26.1-26.4 are opened and the slicing operation continues for the remaining logs K1-K3 while the carriage 13 moves forward, since the gripper 14.4 with log K4 can no longer move forward.

This takes place until the next log is completely sliced according to FIG. 5*b*, i.e. the base body 23 of the gripper holding it strikes the end position stop arranged in this lane, which is the case here simultaneously for logs K1 and K3 according to FIG. 5*b*.

During this forward movement of the carriage 13, the piston rod in lane SP4 has moved into the cylinder there, while the piston rods in the other lanes SP1 to SP3 have been extended proportionately by ⅓ of this offset distance V1 during the extension of these, as already explained in FIG. 4*b*.

This must be taken into account by correspondingly shorter travel distances of the carriage 13 between the separation processes starting from the standstill of the first gripper 14.4 and its fully sliced log K4.

Now that three grippers 14.1, 14.3, 14.4 are already in contact with their base bodies 23 at the respective end position stops as shown in FIG. 5*b*, the not yet completely sliced log K2 can be further sliced by continuing to move the gripper carriage 13 forward, with the shut-off valves 26.1-26.4 still open, until it is also in contact with its end position stop 27.2 as shown in FIG. 5*c*.

In this case, the piston rods of the stationary grippers 14.1, 14.3, 14.4 move synchronously into their cylinders, whereby the piston rod of the not yet completely sliced log K2 is extended by three times this retraction length, which in turn must be taken into account in the controlled forward movement of the carriage 13 in order to continue to achieve the generally constant desired slice thickness.

After all logs K1 to K4 have been completely sliced and all base bodies of all grippers are in contact with the respective end position stops, the grippers are deactivated, i.e. their claws 16 are moved out of the logs and in particular these log remnants are discarded, all shut-off valves 26.1-

26.4 are moved into the blocking position, and the carriage 13 then moves back into its initial position.

FIGS. 6*a* to *f* show—for reasons of space only, for a three-lane slicing machine, which however is irrelevant for the method according to the disclosure—the gripping of newly inserted logs K1—K3 of different lengths.

This further design of the slicing machine differs from the design described up to now in that each working chamber 25.1*a*-25.3*a* can optionally be connected to the hydraulic pump 29 or to a low-pressure chamber with a lower pressure than in the working chamber, in particular to a tank T under ambient pressure or an outflow.

A restrictor, preferably adjustable, or a pressure holding valve, preferably adjustable, can be provided in the inflow to the tank T in order to maintain a low residual pressure in the working chamber connected thereto even when there is an opening to the tank T.

In the case shown, the optional closing or connection to hydraulic pump 29 or tank T is realized by a shut-off valve 26.1-26.3 being located on the pressure medium connection of each working chamber 25.1*a*-25.3*a*, which now has three connections and three valve positions, i.e. a ⅔ valve in each case.

On the cylinder side, there is one valve connection on each valve, which is hydraulically connected to the respective working chamber of the hydraulic cylinder; at the end facing away from the cylinder, there are two valve connections, of which the one, here the right-hand one, valve connection, is connected to the hydraulic pump 29 via a corresponding connecting line, which hydraulically couples all the cylinder connections.

The left-hand valve connection is connected to the pressureless tank T via a different connecting line.

Instead of this, however, each working chamber 25.1*a*-25.3*a* could also have two separate connections, one of which can be connected to the hydraulic pump 29 via a shut-off valve and the other to the low-pressure chamber, in particular the tank T, via a shut-off valve.

Figure 6A:
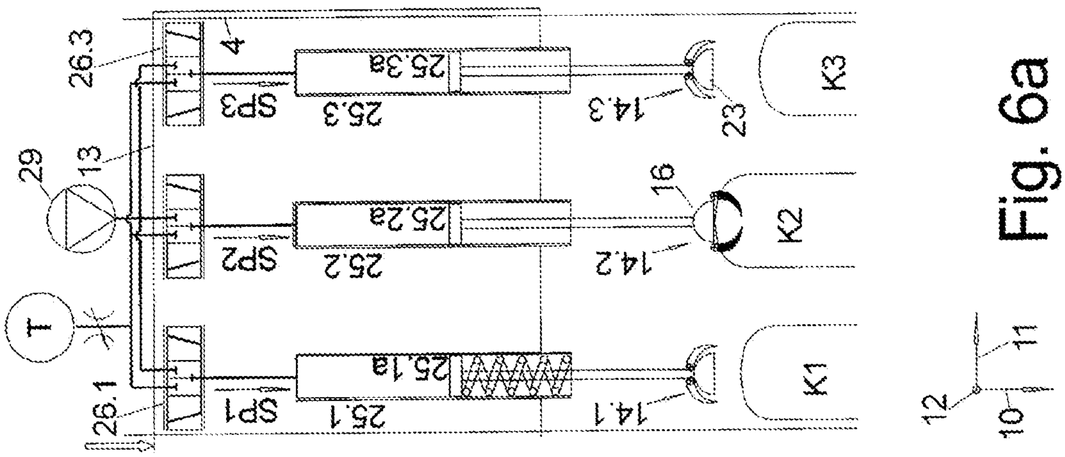
FIGS. 6*a*-*f*: show different movement states during the gripping of newly inserted logs of different lengths with this second embodiment.

FIG. 6*a* shows the state in which the gripper carriage 13 with the grippers 14.1-14.3 in the initial position—in which they are in the same longitudinal positions—and valves 26.1-26.3 in the closed position is moved forward in the feed direction 10 until the longest log, in this case K2, is contacted at its rear end by the gripper 14.2 approaching in this lane, and the gripper claws 16 of this gripper 14.2 are activated and are extended into the log K2 and hold it.

Figure 6B:
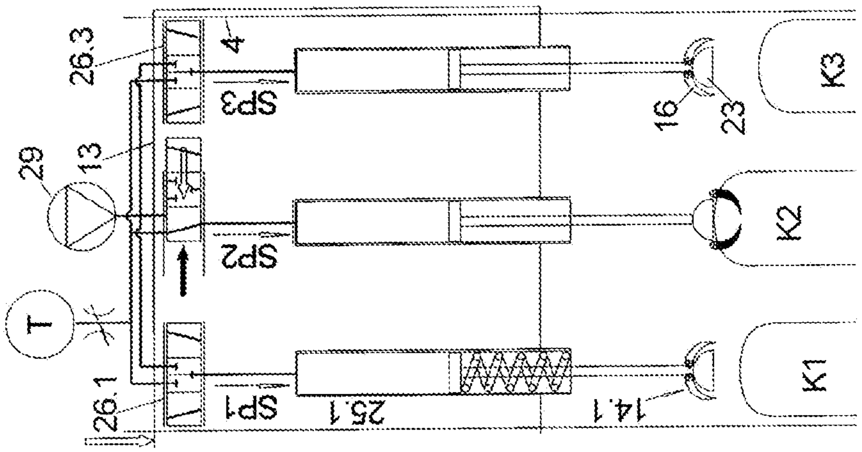

Then, as shown in FIG. 6*b*, this shut-off valve 26.2—here in each case slide valves with three switching positions—is switched, i.e. displaced, so that the working chamber 25.2*a* of the corresponding hydraulic cylinder 25.2 is connected to the tank T.

The carriage 13 can then be moved further forwards, wherein in the hydraulic cylinder 25.2 the piston retracts into the cylinder due to the standstill of the gripper 14.2. The carriage 13 continues to move forward until the next-shorter log K1 is contacted by the corresponding gripper 14.1 and is gripped by activating the gripper claws 16 as shown in FIG. 6*c*.

Figure 6C:
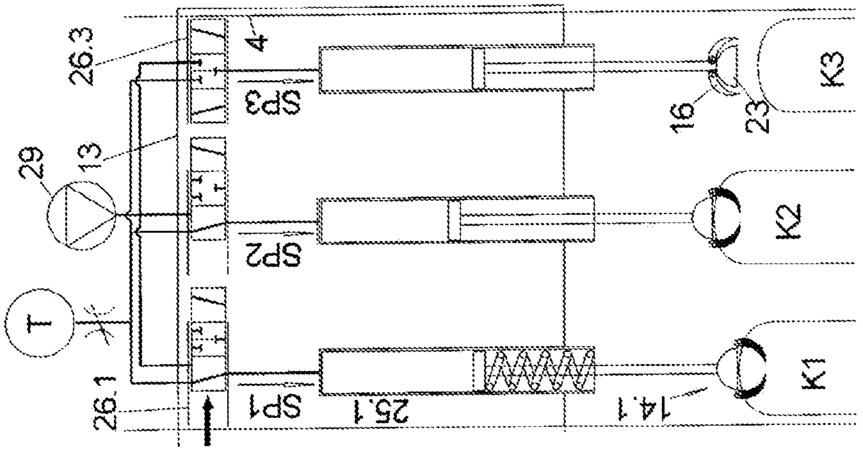
Figure 6F:
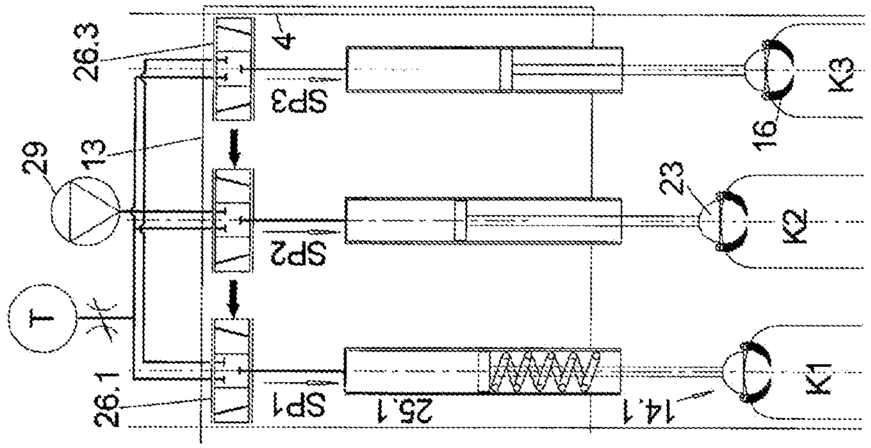
Figure 6E:
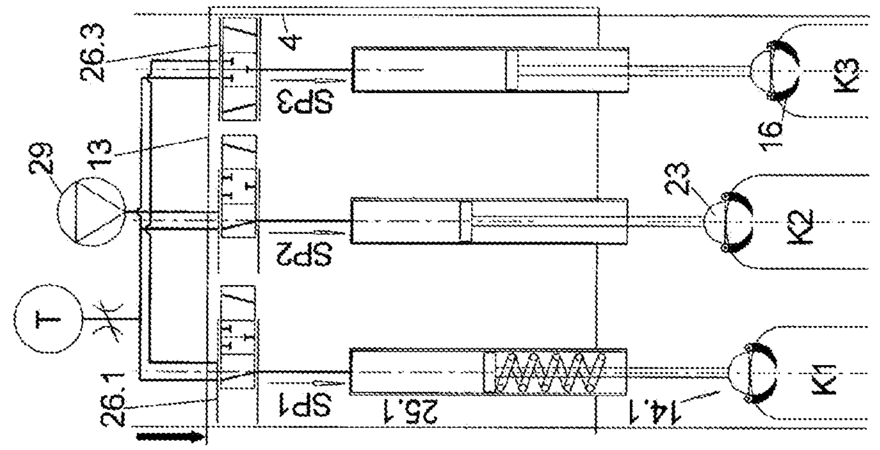
Figure 6D:
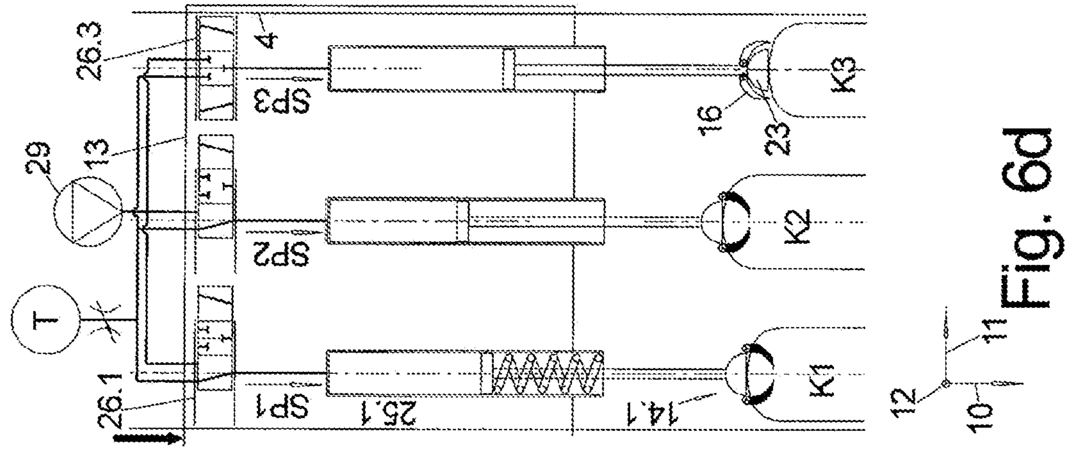

Then, according to FIG. 6*c*, this stop valve 26.1 is also switched to the connection between the working chamber 25.1*a* and the tank T and then the carriage 13 is moved further forward with all hydraulic cylinders according to FIG. 6*d* until the gripper 14.3 arranged in the corresponding lane contacts the next-shorter, here the last, log K3 and its gripper 14.3 is activated by extending the gripper claws 16 according to FIG. 6*e*.

All shut-off valves 26.1-26.3 are then moved into the closed position, here the middle 5 position of the slide valve, so that the pressure medium connections of all working chambers 25.1*a*-25.3*a* are closed and an unchangeable longitudinal distance is fixed between the gripper carriage 3 and the corresponding gripper.

With this slicing position of the shut-off valves 26.1-26.3, the logs K1 to K3 are then sliced until the first log is completely sliced and the base body 23 of the gripper holding it has reached the corresponding end-position stop.

Figure 7A:
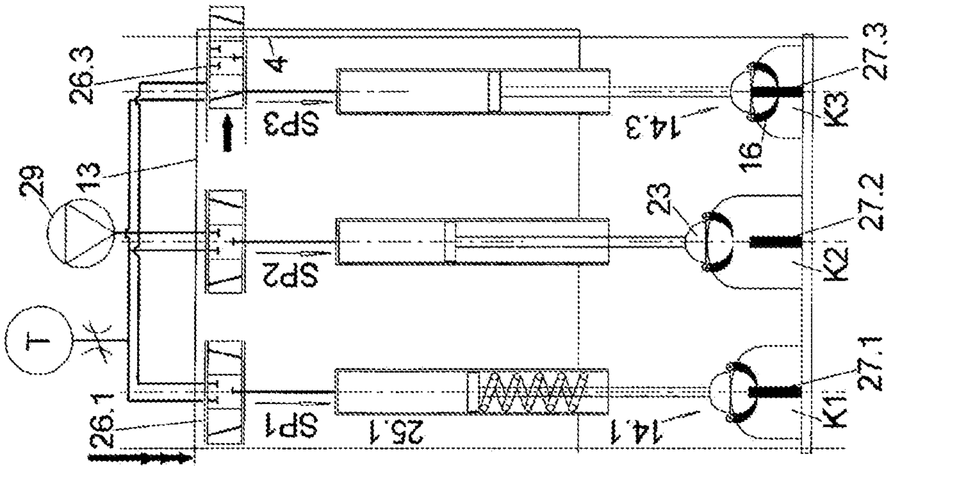
FIGS. 7*a*-*c*: show different movement states when the logs have been completely sliced, which occurs at different times, with this second embodiment.

This state is shown in FIG. 7*a*, where the base body 23 15 of the right-hand gripper 14.3 is the first to strike the right-hand end position stop 27.3, because the right log K3 is the first to be completely sliced.

Then, triggered by this, the right-hand shut-off valve 26.3 switches to flow operation to tank T and, while the carriage 13 moves forward, the slicing operation is continued for the remaining logs K1, K2, because the gripper 14.3 with log K3 can no longer move forward.

Figure 7B:
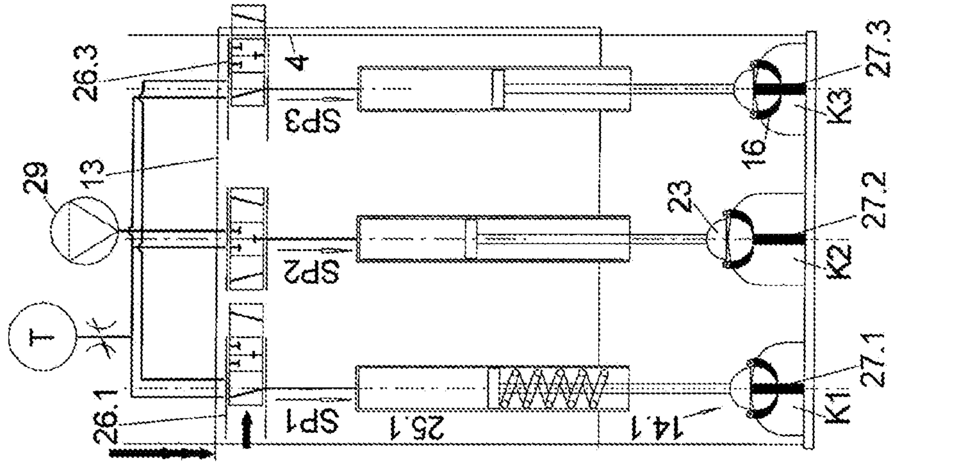

This is the case until the next log K1 has been completely sliced as shown in FIG. 7*b*, i.e. the base body 23 of the gripper 14.1 holding it makes contact with the end position stop 27.1 in this lane. Then the shut-off valve 26.1 in this lane SP1, which has reached the stop, is also switched to connection to tank T.

Here the gripper carriage 13 can be moved forward with the same step width as in normal slicing operation, i.e. when no log has yet been completely sliced.

Figure 7C:
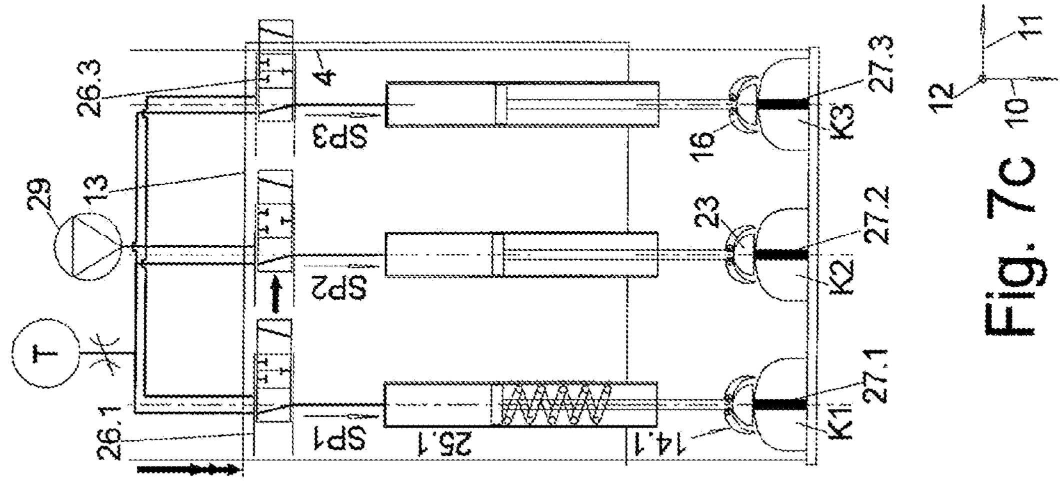

Now that two grippers 14.1, 14.3 are already in contact with their base bodies 23 at the respective end position stops 27.1, 27.3 as shown in FIG. 7*b*, the not yet completely sliced log K2 can be further sliced by continuing to move the gripper carriage 13 forward until it is also in contact with its end-position stop 27.2, as shown in FIG. 7*c*.

After all logs K1 to K4 have been completely sliced and all base bodies of all grippers are in contact with the respective end-position stops, the grippers are deactivated, i.e. their claws 16 are moved 10 out of the logs K1-K3, and in particular these log remnants are discarded.

The gripper carriage 13 is then moved back to its initial position and all shut-off valves 26.1-26.4 are switched to the closed position.

As required, detailed embodiments of the present disclosure are provided herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

LIST OF REFERENCE NUMBERS

1 Slicing machine, slicer
1* Controller

2 Base frame
3 Blade
3 Axis of rotation
3" Blade plane, slicing plane
3*a* Slicing edge
4 Feed conveyor, feed belt
5 Cutting frame
6*a-d* Product opening
7 Slicing unit
8.1, 8.2 Upper product guide, upper guide belt
8*a* Deflection roller at the cutting frame side
8*b* Defection roller oriented away from the cutting frame
9 Lower product guide, lower guide belt
9*a* Deflection roller on through-plate side
9*b* Deflection roller oriented away from through-plate
10 Feed direction, longitudinal direction, axial direction
10* Longitudinal centre
10* Direction of passage through machine
11 1 st transverse direction (width slicer)
12 2nd transverse direction (height-direction of log)
13, 13*a, b* Gripper unit, gripper carriage
13.1-13.4 Gripper unit, gripper carriage
14,14*a-d* Gripper
15 Spacer
16 Gripper claw
17 Discharge unit
17*a, b, c* Portioning belt, discharge conveyor
18*a, b* Gripper guide
19 Height sensor
20 Feeding unit
21 Residual piece conveyor
22*a, b, c* Carriage drive
23 Gripper base body
24 Connecting line
25.1, 25.2 Hydraulic cylinder unit
25.1*p*, 25.2*p* Pressure medium connection
25.1*o*, 25.2*o* Pressureless connection
25.1A, 25.2A Cylinder
25.1B, 25.2B Piston
25.1*a*, 25.2*a* Working chamber
26.1, 26.2 Shut-off valve
27.1, 27.2 End-position sensor, mechanical stop
28 Spring
29 Hydraulic pump
30 Tank
31.1, 31.2 Drain line
32.1, 32.2 Drain valve
K Log, product log
KR Residual piece
S Slice
P Portion
V Packaging element

What is claimed is:

1. A multi-lane slicing machine for slicing product logs into slices, the multi-lane slicing machine comprising:

a base frame;

a slicing unit;

a feeding unit comprising a feeding conveyor for feeding the product logs to the slicing unit, the feeding unit having a plurality of lanes and comprising a plurality of grippers, each associated with one of the plurality of lanes, a gripper carriage for carrying the grippers, a carriage guide, wherein the gripper carriage is moveable along the carriage guide in a controlled manner in a feed direction, and a controller for controlling movement of the gripper carriage;

a plurality of hydraulic cylinder units for acting in the feed direction between the plurality of grippers and the gripper carriage, wherein each hydraulic cylinder unit of the plurality of hydraulic cylinder units is mechanically operatively connected to a respective one of the plurality of grippers and to the gripper carriage;

a pressure medium connection for each hydraulic cylinder unit, wherein each pressure medium connection has a shut-off valve; and a plurality of stationary end-position sensors in a blade-side end area of a movement path of each gripper of the plurality of grippers or of a part of each hydraulic cylinder unit connected to each gripper, wherein the hydraulic cylinders are operatively connected hydraulically via a connecting line, and each end-position sensor of the plurality of stationary end-position sensors is a mechanical stop for its respective gripper or of the part of the hydraulic cylinder unit connected to the gripper.

2. The multi-lane slicing machine according to claim 1, wherein corresponding working chambers of the hydraulic cylinder units are hydraulically coupled.

3. The multi-lane slicing machine according to claim 1, wherein the hydraulic cylinder units are single-acting hydraulic cylinder units, each with only one pressurizable working chamber, which are hydraulically effectively connected via the connecting line, and the working chamber is in each case located at the end of a piston facing away from the gripper.

4. The multi-lane slicing machine according to claim 3, wherein a spring is present at the end of the piston opposite the working chamber, and the spring is a compression spring supported between the respective piston and the end of the cylinder.

5. The multi-lane slicing machine according to claim 1, wherein each hydraulic cylinder unit is connected individually or via a common connecting line to a hydraulic pump.

6. The multi-lane slicing machine according to claim 1, wherein each hydraulic cylinder unit is individually connected to a tank for a pressure medium or to an outlet via a drain line containing a drain valve.

7. The multi-lane slicing machine according to claim 2, wherein each of the plurality of grippers has gripper claws extendable from a gripper base body and a prong drive for extension, the prong drive is the respective hydraulic cylinder unit, and a respective piston rod is operatively connected to the gripper claws in such a way that a forward movement of the piston rod in the direction of the gripper base body increasingly extends the gripper claws out of the gripper base body.

8. A method for controlling product grippers of a multi-lane slicing machine according to claim 7, wherein each gripper of the plurality of grippers is attached to a hydraulic cylinder unit with a closable pressure medium connection, the method comprising:

closing the pressure medium connection of each of the hydraulic cylinder units during a slicing operation;

opening at least one working chamber connection of the working chamber of the hydraulic cylinder unit arranged in the lane of a first log of a plurality of logs when the first log has been completely sliced; and moving the gripper carriage forward for further slicing of remaining logs while retracting the piston rod of the hydraulic cylinder unit in the lane of the completely sliced first log.

9. The method according to claim 8, wherein for hydraulically connected pressure medium connections in the case of the completely sliced first log, all pressure medium connections of all hydraulic cylinder units are opened, thereafter, the gripper carriage is moved forward with a shorter travel distance between slicing operations to compensate for an additional extension distance of other hydraulic cylinder units caused by retraction of the hydraulic cylinder unit in the lane of the completely sliced first log, and wherein the gripper carriage for n hydraulic cylinder units and a normal path d between two separating processes is reduced by d:(n−1) corresponding to the thickness of the slices to be separated.

10. The method according to claim 8, wherein for hydraulic cylinder units whose working chamber has an additional connection comprising a pressureless connection, in the case of the completely sliced first log, only the additional connection comprising the pressureless connections of the hydraulic cylinder unit, in the lane of the completely sliced first log is open to a defined pressureless surrounding environment comprising a tank or an open outlet, thereafter, the gripper carriage is moved forward between separation processes with an unchanged travel path.

11. The method according to claim 8, wherein to grip the logs the hydraulic cylinder units are each subjected to working pressure and their piston rods are extended over a portion of their maximum extension length, until the piston rests against a compression spring in the cylinder, the gripper carriage is moved forward until each of the grippers, one after the other, contacts and grip a log lying in its lane, before slicing begins, the pressure medium connections of the hydraulic cylinders are closed.

12. The method according to claim 11, wherein for gripping the logs before closure of the pressure medium connections of the hydraulic cylinder units and after the contacting of the respective log by a gripper base body, the pressure in the hydraulic cylinder is used to extend the gripper claws of the contacting gripper base body.

13. A slicing machine for slicing product logs into slices, the slicing machine comprising:

a slicing unit;

a feeding unit comprising a feeding conveyor for feeding the product logs to the slicing unit, the feeding unit having a plurality of lanes and comprising a plurality of grippers, each associated with one of the plurality of lanes, and a gripper carriage for carrying the grippers;

a plurality of hydraulic cylinder units between the plurality of grippers and the gripper carriage, wherein each hydraulic cylinder unit of the plurality of hydraulic cylinder units is mechanically operatively connected to a respective one of the plurality of grippers and to the gripper carriage; and a plurality of position sensors in an area of a movement path of each gripper of the plurality of grippers or of a part of each hydraulic cylinder unit connected to each gripper, wherein the hydraulic cylinders are operatively connected hydraulically via a connecting line, and each position sensor of the plurality of position sensors is a mechanical stop for its respective gripper or of the part of the hydraulic cylinder unit connected to the gripper.

14. The slicing machine according to claim 13, wherein corresponding working chambers of the hydraulic cylinder units are hydraulically coupled.

15. The slicing machine according to claim 13, wherein the hydraulic cylinder units are single-acting hydraulic cylinder units, each with only one pressurizable working chamber, which are hydraulically effectively connected via the connecting line, and the working chamber is in each case located at the end of a piston facing away from the gripper.

16. The slicing machine according to claim 15, wherein a spring is present at the end of the piston opposite the working chamber, and the spring is a compression spring supported between the respective piston and the end of the cylinder.

17. The slicing machine according to claim 13, wherein each hydraulic cylinder unit is connected individually or via a common connecting line to a hydraulic pump.

18. The slicing machine according to claim 13, wherein each hydraulic cylinder unit is individually connected to a tank for a pressure medium or to an outlet via a drain line containing a drain valve.

* * * * *